E. H. ASHCROFT.
Peat Machine.
No. 53,769.
Patented Apr. 10, 1866.
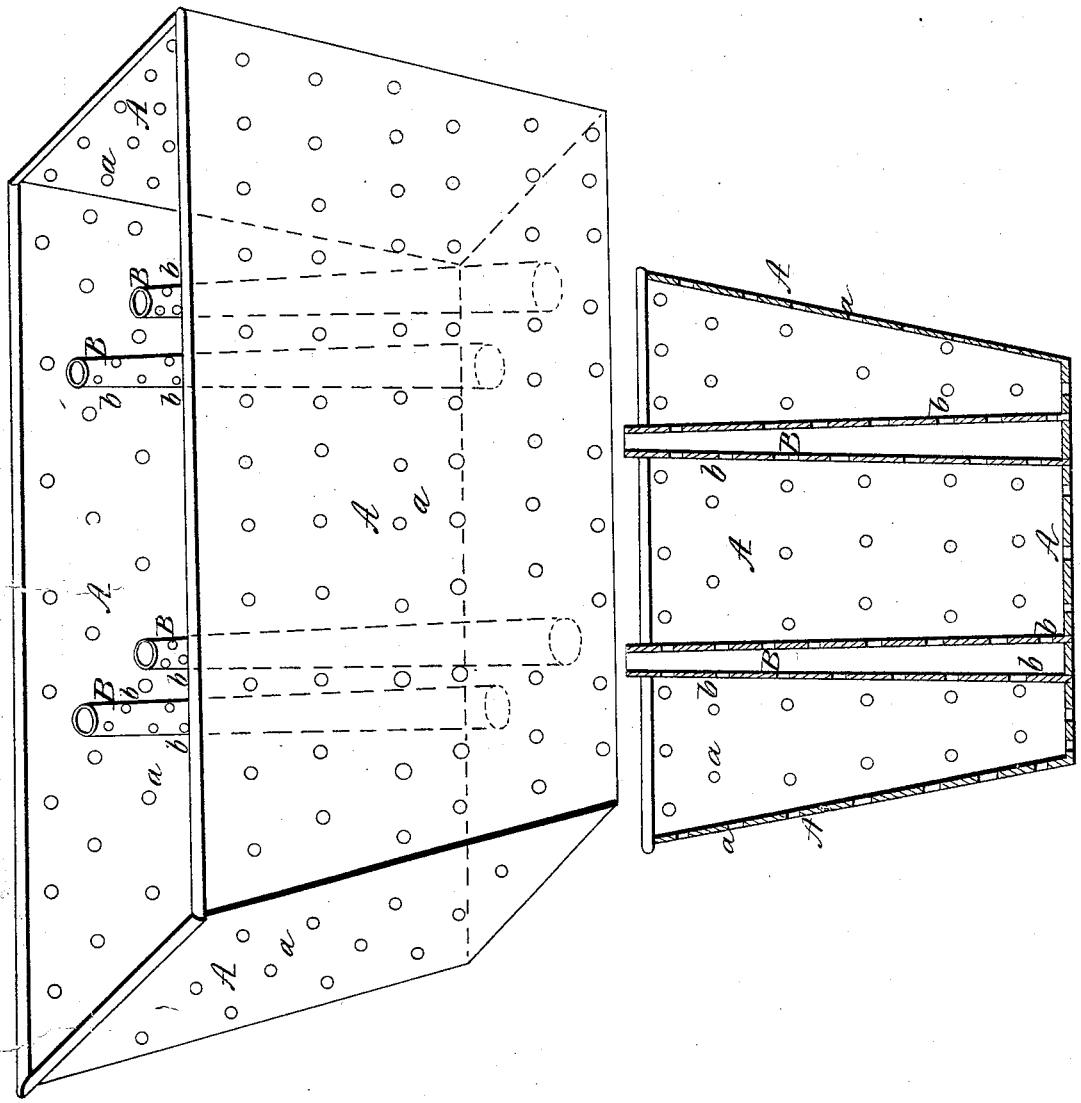
Witnesses:
W. D. Baldwin
Fo. Schmidz
Inventor:
E. H. Ashcroft
by his attorney
S. S. Fahnestock

UNITED STATES PATENT OFFICE.

E. H. ASHCROFT, OF LYNN, MASSACHUSETTS.

IMPROVED CISTERN FOR DRAINING PEAT.

Specification forming part of Letters Patent No. 53,769, dated April 10, 1866.

*To all whom it may concern:*

Be it known that I, E. H. ASHCROFT, of the city of Lynn, county of Essex, in the State of Massachusetts, have invented a new and Improved Tank for Draining Peat Preparatory to its Use for Fuel; and I do hereby declare that the following is a full and exact description thereof, reference being had to the accompanying drawings, and to the letters of reference marked thereon.

The nature of my invention consists in the peculiar construction of a tank or vessel, insuring much more rapid drainage, effected by the additional use of perforated tubes passing up from the bottom of the vessel to or near its top.

It is well known to all skilled in the art that in the preparation of peat for fuel it has to undergo several processes by machinery, &c., one condition of its usefulness being certain dryness. Good drainage promotes this and facilitates the manufacture.

To enable others to make and use my invention, I will proceed to describe it.

In the drawings, Figure 1 represents a perspective view of my draining-vessel, showing its sides and bottom well perforated. The exterior shape of the vessel may vary in form—for instance, may be cylindrical, &c. Fig. 2 shows a transverse section of Fig. 1.

A indicates the sides and bottom; $a$, the perforations in the same; B, tubes, also perforated, as shown at $b$, which are secured to the bottom of the vessel and opening through it. The number of these perforated tubes can be regulated by the size of the vessel. By the use of them the draining-surface is greatly increased, and the peat will much sooner be ready to be pressed or molded into suitable form for use as fuel.

In the drawings but four tubes are shown in the vessel. The number does not affect the nature of the invention.

Having thus described my invention, what I claim as new, and desire to secure by Letters Patent of the United States, is—

The tank or drainage-vessel, constructed as described, with perforated sides and bottom, together with the perforated tubes connected therewith.

E. H. ASHCROFT.

Witnesses:
  JOHN P. WOODBURY,
  A. J. CHASE.